March 2, 1937.　　　　D. A. GREENE　　　　2,072,554

METHOD OF MAKING WINDOW GUIDE CORES

Original Filed May 29, 1935

Inventor,
Daniel A. Greene,
by his Attorney

Patented Mar. 2, 1937

2,072,554

UNITED STATES PATENT OFFICE 2,072,554

METHOD OF MAKING WINDOW GUIDE CORES

Daniel A. Greene, Flint, Mich.

Original application May 29, 1935, Serial No. 24,013, now Patent No. 2,026,973, dated January 7, 1936. Divided and this application January 3, 1936, Serial No. 57,338

6 Claims. (Cl. 140—3)

This invention relates to methods for making cores for window glass guides of the type shown in my Patent No. 2,026,973, dated January 7th, 1936, of which this application is a division, and in which the core consists of a connected series of overlapping coils of wire arranged in approximately the same plane and connected by suitable means, so that the core may be bent into channel form and suitable cushioning material may be applied thereto to form the completed window glass guide or channel.

The object of my invention is to provide a suitable and practical method of producing a core of the type above referred to, which will enable the same to be produced in sections of indefinite length and at a minimum cost.

I accomplish this object in the manner hereinafter described and as illustrated in the accompanying drawing in which:—

Figure 1:
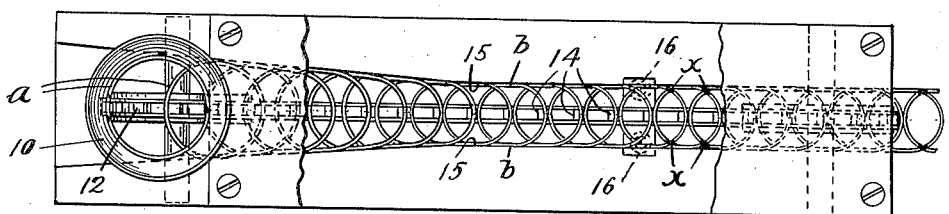
Fig. 1 is a plan view and Fig. 2 a longitudinal sectional view indicating a form of apparatus which may be employed in performing my method.
Figure 2:
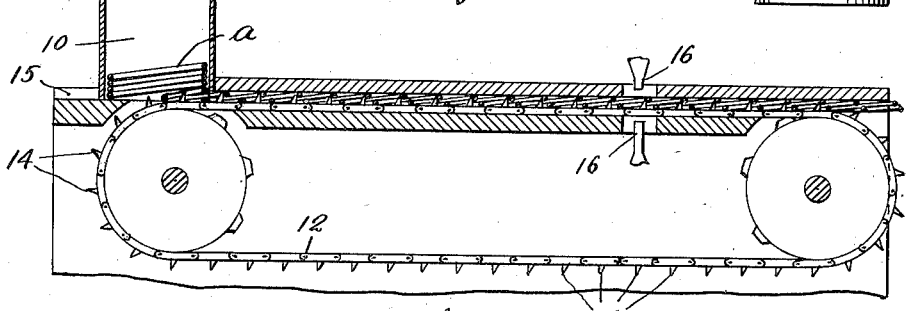
Figure 3:
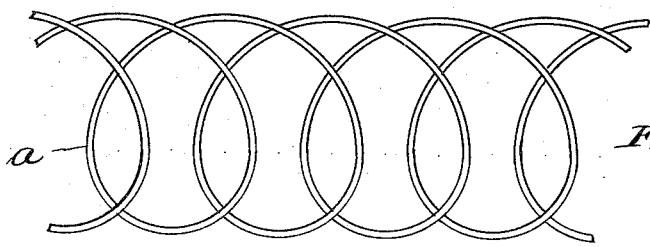
Figs. 3 and 4 are detail plan views indicating different stages of the operation.
Figure 4:
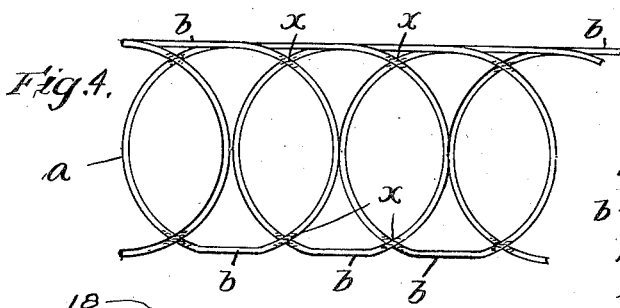

As shown in Figs. 1 and 2, an apparatus similar to that disclosed in my said patent is indicated, in which a series of connected or spirally wound wire coils of indefinite length are supported in a vertical tube 10 across the open lower end of which an endless feed chain 12 is driven horizontally, said chain having suitably spaced teeth 14 which successively remove the bottom coil from the series of coils and draw them in correspondingly spaced relation between guideways 15, each coil being overlapped by the next succeeding coil, so that a segmental portion of one coil is overlapped by a segmental portion of an adjacent coil, as shown in Figs. 1 and 3. The guideways 15 are arranged to extend convergently from the tube 10, so that, as the coils are drawn along therein, they will be compressed transversely into a somewhat elliptical form, and this operation is continued until each coil has an approximately straight section $b$ at each side. From this point the guideways are extended in parallelism, so that the straight sections $b$ of each coil are approximately aligned at each side, as indicated in Fig. 4.

As thus arranged the straight portion of a coil, at what may be considered as its front end, passes over a coil in advance, at the rear end of the straight portion thereof, and, at its rear end, it passes beneath a coil in the rear, at the front end of the straight portion of the latter. At the points, as X, where the coils cross each other they are spot welded together by a ribbon welder, the terminals 16 of which are indicated, or by any other suitable means, so that the coils, as thus arranged, are secured together in fixed relation, this operation being performed either at all points where the wires cross, or only at a portion of such points, but at a sufficient number of points to prevent substantial relative displacement of the coils.

Figure 5:
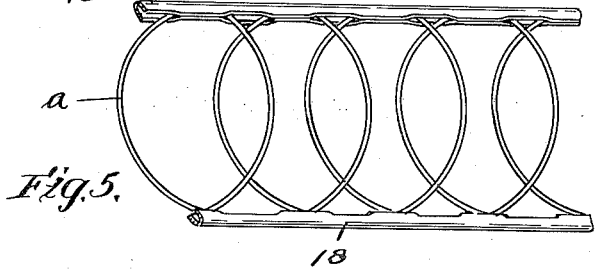
Fig. 5 is a similar view showing a modification.

In lieu of connecting the coils by spot welding, the coils may be passed into U-shaped beads 18 at their opposite edges, and the beads may be pinched together about the wires, as indicated in Fig. 5. If this means of connecting the coils is employed, the coils may or may not first be pressed into elliptical form.

Figure 6:
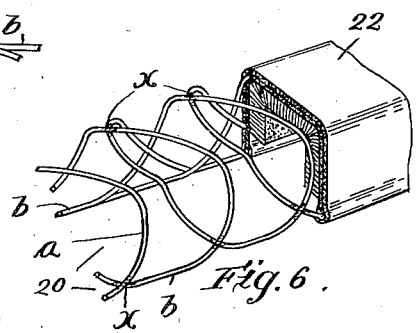
Fig. 6 is a combined sectional and perspective view, indicating a channel in which a core produced by my method is employed.

After the coils are thus drawn out into a substantially flat formation and secured together against relative displacement, they are then bent transversely into channel form to form a channel core, as 20. The core thus produced is covered externally and internally by cloth 22, or any other suitable cushioning material, as indicated in Fig. 6, usually, before being bent transversely.

If the connecting bead 18 is employed it may be covered with the cushioning material, or the latter may be applied in a manner to leave the beads exposed as will be obvious.

The form of wire employed is readily bendable, but retains sufficient resiliency to provide a stable core.

I claim:

1. The method of forming a core for a window glass guide which consists in providing a continuous series of coils of wire of indefinite length, arranging the coils thereof successively, so that they lie in approximately the same plane, connecting portions of said coils so that the coils are thus held in fixed relation, and then bending the connected coils transversely into channel form.

2. The method of forming a core for a window glass guide which consists in providing a continuous series of wire coils, elongating said coils and moving them into laterally disposed positions so that portions of adjacent coils overlap and said coils lie in approximately the same plane, connecting said coils in relatively fixed relation and then bending them transversely into channel form.

3. The method of forming a core for a window glass guide which consists in providing a continuous series of wire coils, elongating said coils and moving them into laterally disposed positions so that portions of adjacent coils overlap and said coils lie in approximately the same plane, connecting said coils at overlapping points, to hold them in fixed relation, and then bending them transversely into channel form.

4. The method of forming a core for a window glass guide which consists in providing a continuous series of wire coils, elongating said coils, and moving them into laterally disposed positions so that portions of adjacent coils overlap and said coils lie in approximately the same plane, pressing the opposite side portions of said coils towards each other to shape them into approximately elliptical form and provide relatively straight approximately aligned side portions, connecting adjacent portions of said coils as thus held and then bending them transversely into channel form.

5. The method of forming a core for a window glass guide which consists in providing a continuous series of wire coils, elongating said coils and moving them into laterally disposed positions so that portions of adjacent coils overlap and said coils lie in approximately the same plane, pressing the opposite side portions of said coils towards each other to flatten the same and provide relatively straight approximately aligned portions at each side, connecting said coils at overlapping points and then bending the connected coils transversely into channel form.

6. The method of forming a core for a window glass guide which consists in providing a continuous series of wire coils, elongating said coils, and moving them into laterally disposed positions so that portions of adjacent coils overlap and said coils lie in approximately the same plane, welding said coils together at overlapping points and then bending them transversely into channel form.

DANIEL A. GREENE.